US010906808B2

(12) United States Patent
Marker et al.

(10) Patent No.: US 10,906,808 B2
(45) Date of Patent: Feb. 2, 2021

(54) NOBLE METAL CATALYSTS AND PROCESSES FOR REFORMING OF METHANE AND OTHER HYDROCARBONS

(71) Applicant: Gas Technology Institute, Des Plaines, IL (US)

(72) Inventors: Terry Marker, Palos Heights, IL (US); Martin Linck, Roscoe, IL (US); Jim Wangerow, Oak Park, IL (US); Pedro Ortiz-Toral, Wheeling, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 15/813,781

(22) Filed: Nov. 15, 2017

(65) Prior Publication Data
US 2019/0144274 A1 May 16, 2019

(51) Int. Cl.
*C01B 3/40* (2006.01)
*B01J 23/656* (2006.01)
(Continued)

(52) U.S. Cl.
CPC ............... *C01B 3/40* (2013.01); *B01J 23/10* (2013.01); *B01J 23/63* (2013.01); *B01J 23/6567* (2013.01);
(Continued)

(58) Field of Classification Search
CPC .......... C01B 3/40; B01J 23/10; B01J 23/6567
(Continued)

(56) References Cited

U.S. PATENT DOCUMENTS

| 4,981,669 A | * | 1/1991 | Pinto | C01B 3/025 |
| | | | | 252/376 |
| 5,507,939 A | * | 4/1996 | Russ | C10G 61/06 |
| | | | | 208/134 |

(Continued)

FOREIGN PATENT DOCUMENTS

| CN | 106475096 A | 3/2017 |
| EP | 1852181 A1 | 11/2007 |

(Continued)

OTHER PUBLICATIONS

Natural gas composition Jessica Lee, pp. 1-2 Downloaded on Mar. 21, 2019 (Year: 2015).*

*Primary Examiner* — Douglas B Call
(74) *Attorney, Agent, or Firm* — Banner & Witcoff, Ltd.

(57) ABSTRACT

Processes for converting methane and/or other hydrocarbons to synthesis gas (i.e., a gaseous mixture comprising $H_2$ and CO) are disclosed, in which at least a portion of the hydrocarbon(s) is reacted with $CO_2$. At least a second portion of the methane may be reacted with $H_2O$ (steam), thereby improving overall thermodynamics of the process, in terms of reducing endothermicity ($\Delta H$) and the required energy input, compared to "pure" dry reforming in which no $H_2O$ is present. Catalysts for such processes advantageously possess high activity and thereby can achieve significant levels of methane conversion at temperatures below those used conventionally under comparable conditions. These catalysts also exhibit high sulfur tolerance, in addition to reduced rates of carbon (coke) formation, even in the processing (reforming) of heavier (e.g., naphtha boiling-range or jet fuel boiling-range) hydrocarbons. The robustness of the catalyst translates to high operating stability. A representative catalyst comprises 1 wt-% Pt and 1 wt-% Rh as noble metals, on a cerium oxide support.

25 Claims, 5 Drawing Sheets

(51) Int. Cl.
*B01J 23/10* (2006.01)
*B01J 23/63* (2006.01)

(52) U.S. Cl.
CPC ............ *C01B 2203/0233* (2013.01); *C01B 2203/0238* (2013.01); *C01B 2203/0283* (2013.01); *C01B 2203/043* (2013.01); *C01B 2203/0405* (2013.01); *C01B 2203/107* (2013.01); *C01B 2203/1064* (2013.01); *C01B 2203/1082* (2013.01); *C01B 2203/1241* (2013.01)

(58) Field of Classification Search
USPC ........................................................ 252/373
See application file for complete search history.

(56) References Cited

U.S. PATENT DOCUMENTS

| | | | |
|---|---|---|---|
| 6,527,980 B1* | 3/2003 | Roden | C01B 3/384 252/373 |
| 7,166,268 B2 | 1/2007 | Fukunaga | |
| 2008/0069765 A1* | 3/2008 | Jiang | C01B 3/382 423/651 |
| 2011/0233472 A1* | 9/2011 | Hotz | B01J 23/42 252/373 |
| 2015/0307352 A1* | 10/2015 | Kumar | B01J 37/031 252/373 |
| 2016/0059217 A1* | 3/2016 | Bal | B01J 23/80 252/373 |
| 2016/0152905 A1* | 6/2016 | Kelfkens | C10G 45/00 518/704 |
| 2017/0001176 A1 | 1/2017 | D'Souza et al. | |
| 2017/0137285 A1* | 5/2017 | Ide | C01B 3/40 |
| 2018/0078923 A1* | 3/2018 | Herskowitz | B01J 37/031 |

FOREIGN PATENT DOCUMENTS

| | | | |
|---|---|---|---|
| EP | 2308594 A2 | | 4/2011 |
| GB | 2170508 | * | 8/1986 |
| WO | 2015/183200 A1 | | 12/2015 |
| WO | WO 2016/162886 | * | 10/2016 |

* cited by examiner

NOBLE METAL CATALYSTS AND PROCESSES FOR REFORMING OF METHANE AND OTHER HYDROCARBONS

STATEMENT REGARDING FEDERALLY SPONSORED RESEARCH OR DEVELOPMENT

This invention was made with government support under U.S. Department of Energy Award DE-EE-0007009. The government has certain rights in the invention.

FIELD OF THE INVENTION

Aspects of the invention relate to catalysts and processes for the reforming of methane and/or other hydrocarbons, and more particularly to the reaction of such hydrocarbon(s) with $CO_2$ as an oxidant, or with both $CO_2$ and $H_2O$ as a combination of oxidants, in the presence of a noble metal-containing catalyst, to produce a synthesis gas product comprising $H_2$ and CO.

DESCRIPTION OF RELATED ART

The ongoing search for alternatives to crude oil, for the production of hydrocarbon fuels is increasingly driven by a number of factors. These include diminishing petroleum reserves, higher anticipated energy demands, and heightened concerns over greenhouse gas (GHG) emissions from sources of non-renewable carbon. In view of its abundance in natural gas reserves, as well as in gas streams obtained from biological sources (biogas), methane has become the focus of a number of possible routes for providing liquid hydrocarbons. A key commercial process for converting methane into fuels involves a first conversion step to produce synthesis gas (syngas), followed by a second, downstream Fischer-Tropsch (FT) synthesis step. In this second step, the synthesis gas containing a mixture of hydrogen ($H_2$) and carbon monoxide (CO) is subjected to successive cleavage of C—O bonds and formation of C—C bonds with the incorporation of hydrogen. This mechanism provides for the formation of hydrocarbons, and particularly straight-chain alkanes, with a distribution of molecular weights that can be controlled to some extent by varying the FT reaction conditions and catalyst properties. Such properties include pore size and other characteristics of the support material. The choice of catalyst can impact FT product yields in other respects. For example, iron-based FT catalysts tend to produce more oxygenates, whereas ruthenium as the active metal tends to produce exclusively paraffins.

With respect to the first conversion step, upstream of FT, known processes for the production of syngas from methane include partial oxidation reforming and autothermal reforming (ATR), based on the exothermic oxidation of methane with oxygen. Steam methane reforming (SMR), in contrast, uses steam as the oxidizing agent, such that the thermodynamics are significantly different, not only because the production of steam itself can require an energy investment, but also because reactions involving methane and water are endothermic. More recently, it has also been proposed to use carbon dioxide ($CO_2$) as the oxidizing agent for methane, such that the desired syngas is formed by the reaction of carbon in its most oxidized form with carbon in its most reduced form, according to:

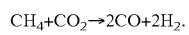

$$CH_4 + CO_2 \rightarrow 2CO + 2H_2.$$

This reaction has been termed the "dry reforming" of methane, and because it is highly endothermic, thermodynamics for the dry reforming of methane are less favorable compared to ATR or even SMR. However, the stoichiometric consumption of one mole of carbon dioxide per mole of methane has the potential to reduce the overall carbon footprint of liquid fuel production, providing a "greener" consumption of methane. This $CO_2$ consumption rate per mole of feed increases in the case of reforming higher hydrocarbons (e.g., $C_2$-$C_6$ paraffins), which may be desired, for example, if hydrogen production (e.g., for refinery processes) is the objective. In any event, the thermodynamic barrier nonetheless remains a major challenge and relates to the fact that $CO_2$ is completely oxidized and very stable, such that significant energy is needed for its activation as an oxidant. In view of this, a number of catalyst systems have been investigated for overcoming activation energy barrier for the dry reforming of methane, and these are summarized, for example, in a review by Lavoie (FRONTIERS IN CHEMISTRY (November 2014), Vol. 2 (81): 1-17), identifying heterogeneous catalyst systems as being the most popular in terms of catalytic approaches for carrying out this reaction.

Whereas nickel-based catalysts have shown effectiveness in terms of lowering the activation energy for the above dry reforming reaction, a high rate of carbon deposition (coking) of these catalysts has also been reported in Lavoie. The undesired conversion of methane to elemental carbon can proceed through methane cracking ($CH_4 \rightarrow C + 2H_2$) or the Boudouard reaction ($2CO \rightarrow C + CO_2$) at the reaction temperatures typically required for the dry reforming of methane. Therefore, although this reaction has been investigated as a promising route for syngas production, the commercialization of this technology, unlike other reforming technologies such as ATR and SMR, remains unrealized. This is due in large part to high rates of carbon formation and the accompanying deactivation of catalysts through coking, as encountered in the use of dry reforming catalyst systems that operate under conditions proposed to date. Finally, whereas other conventional reforming technologies have proven to be economically viable, these processes, and particularly SMR, are known to require significant upstream capital and operating expenses for the removal of sulfur and other poisons of the catalysts used. Otherwise, commercially acceptable periods of operation from a given catalyst loading cannot be achieved. Satisfactory solutions to these and other problems relating to the conventional reforming of hydrocarbons for the production of syngas and/or hydrogen have been sought but not achieved.

SUMMARY OF THE INVENTION

Aspects of the invention are associated with the discovery of catalysts and processes for converting methane and/or other hydrocarbons to synthesis gas (i.e., a gaseous mixture comprising $H_2$ and CO) by reacting at least a portion of such hydrocarbon(s) with $CO_2$. Preferably, according to a $CO_2$-steam reforming reaction, at least a second portion of the hydrocarbon(s) (e.g., comprising the same hydrocarbon(s) as in the first portion) is reacted with $H_2O$ (steam), thereby improving overall thermodynamics of the process, in terms of reducing endothermicity ($\Delta H$) and the required energy input, compared to "pure" dry reforming in which no $H_2O$ is present. Representative catalysts advantageously possess high activity and thereby can achieve significant levels of hydrocarbon (e.g., methane) conversion at temperatures below those used conventionally for dry reforming. These high activity levels, optionally in conjunction with using $H_2O$ to provide at least a portion of the oxidant, contribute to an overall operating environment whereby coke formation is reduced and useful catalyst life may be significantly extended.

Yet further important advantages reside in the sulfur tolerance of catalysts described herein, whereby a pretreatment of a methane-containing feedstock (e.g., natural gas), or other hydrocarbon-containing feedstock, to reduce the concentration of $H_2S$ and other sulfur-bearing contaminants is not required according to preferred embodiments, or is at least not as rigorous as in conventional reforming technologies. Also, to the extent that downstream sulfur removal may be desirable, such as prior to an FT conversion step, this may be greatly simplified, considering that all or at least a substantial portion of sulfur-bearing contaminants other than $H_2S$, such as mercaptans, can be oxidized in a dry reforming or $CO_2$-steam reforming reaction as described herein to $SO_2$, thereby rendering standard acid gas treatment (e.g., scrubbing) as a suitable and relatively simple option for such downstream sulfur removal.

Overall, improvements associated with the processes and catalysts described herein are of commercial significance in terms of rendering dry reforming processes, or otherwise $CO_2$ and steam reforming (i.e., "$CO_2$-steam reforming") processes, as an economically viable alternative to conventional technologies such as autothermal reforming (ATR) and steam methane reforming (SMR) Moreover, the synthesis gas according to these processes may be produced with a favorable molar $H_2$:CO ratio (e.g., about 2:1) for downstream processing via the Fischer-Tropsch (FT) reaction, or at least with a molar ratio that may be readily adjusted to achieve such favorable values.

These and other embodiments, aspects, and advantages relating to the present invention are apparent from the following Detailed Description.

BRIEF DESCRIPTION OF THE DRAWINGS

A more complete understanding of the exemplary embodiments of the present invention and the advantages thereof may be acquired by referring to the following description in consideration of the accompanying figures, in which the same reference numbers are used to identify the same features.

Figure 1A:
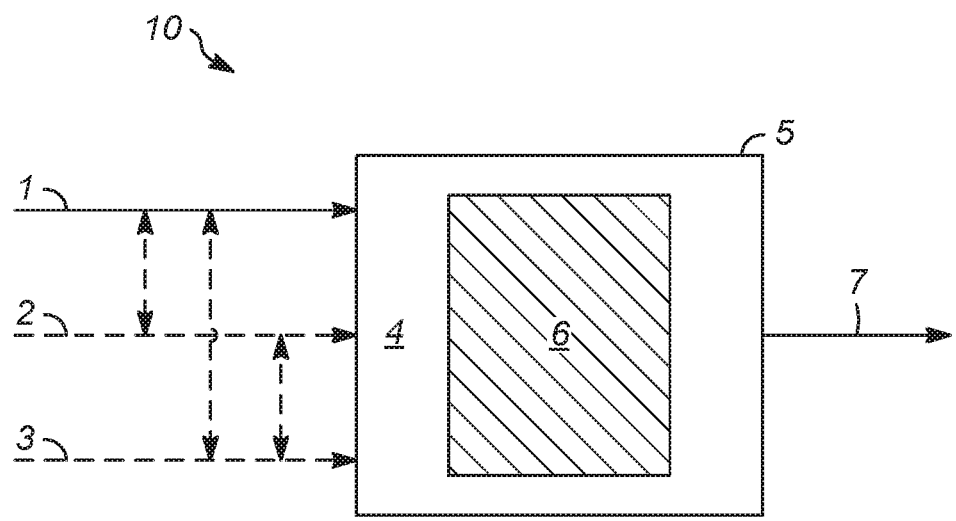
FIGS. 1A and 1B depict flowschemes that illustrate representative dry reforming and $CO_2$-steam reforming processes as described herein.
Figure 1B:
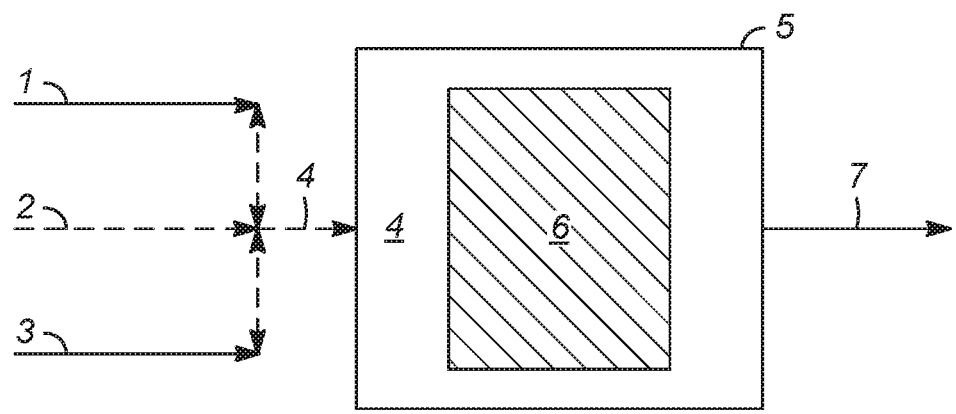

The figures should be understood to present illustrations of processes and certain associated results and parameters and/or principles involved. In order to facilitate explanation and understanding, FIGS. 1A and 1B provide a simplified overview, with the understanding that these figures and elements shown are not necessarily drawn to scale. Valves, instrumentation, and other equipment and systems not essential to the understanding of the various aspects of the invention are not shown. As is readily apparent to one of skill in the art having knowledge of the present disclosure, processes for converting hydrocarbons such as methane, by dry reforming or $CO_2$-steam reforming, will have configurations and elements determined, in part, by their specific use.

DETAILED DESCRIPTION

The expressions "wt-%" and "mol-%," are used herein to designate weight percentages and molar percentages, respectively. The expressions "wt-ppm" and "mol-ppm" designate weight and molar parts per million, respectively. For ideal gases, "mol-%" and "mol-ppm" are equal to percentages by volume and parts per million by volume, respectively.

The term "gaseous mixture" refers to the mixture comprising at least a hydrocarbon such as methane and also comprising $CO_2$ as an oxidant, which is subjected to dry reforming or $CO_2$-steam reforming (if water is also present in the gaseous mixture) by contact with a catalyst as described herein. The term "gaseous mixture" refers generally to this mixture being completely or at least predominantly in the gas phase under conditions used for dry reforming or $CO_2$-steam reforming, including the temperatures and pressures described herein as being suitable for these reactions. The term "gaseous mixture" does not preclude the presence of compounds in this mixture that, like water, are liquid under conditions of ambient temperature and pressure. Such compounds can include hydrocarbons found in liquid fuels including naphtha and jet fuels, for example $C_6$-$C_{16}$ hydrocarbons.

Embodiments of the invention are directed to a process for producing a synthesis gas product (syngas), the process comprising contacting a gaseous mixture comprising (i) methane and/or other hydrocarbon(s) (e.g., any of $CH_4$, $C_2H_6$, $C_2H_4$, $C_3H_8$, $C_3H_6$, $C_4H_{10}$, $C_4H_8$, $C_5H_{12}$, $C_5H_{10}$, higher molecular weight hydrocarbons, and mixtures thereof) and (ii) $CO_2$, with a catalyst comprising at least one (e.g., two, or more than two) noble metals on a solid support comprising cerium oxide. It is possible that $CO_2$ alone can serve as the oxidant for the methane and/or other hydrocarbon(s) to CO and $H_2$ according to the dry reforming of such hydrocarbons, which in the case of alkanes, for example, can be generalized as:

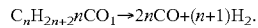
$C_nH_{2n+2}nCO_1 \rightarrow 2nCO+(n+1)H_2$.

In preferred embodiments a combination of $CO_2$ and $H_2O$ can serve as the oxidant, that is, in embodiments in which the gaseous mixture further comprises $H_2O$. The reaction in this case is a "$CO_2$-steam reforming reaction," which also includes steam reforming as a route for producing syngas from methane and/or other hydrocarbons, which in the case of alkanes, for example, can be generalized as:

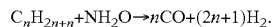
$C_nH_{2n+n}+NH_2O \rightarrow nCO+(2n+1)H_2$.

Whereas the theoretical molar $H_2$:CO ratio of a synthesis gas product formed from the dry reforming of methane is 1, the addition of steam reforming, in the $CO_2$-steam reforming of methane, advantageously provides the potential to increase this molar ratio to values more favorable for downstream Fischer-Tropsch synthesis to produce liquid hydrocarbons, according to:

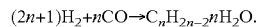
$(2n+1)H_2+nCO \rightarrow C_nH_{2n-2}nH_2O$.

From this, it can be observed that $C_4^+$ hydrocarbons, such as $C_4$-$C_{12}$ hydrocarbons, which are desirable as liquid fuels or components of liquid fuels, are formed ideally at molar $H_2$:CO ratios approaching 2. Importantly, the use of steam ($H_2O$ as an oxidant in combination with $CO_2$ provides an advantageous "handle" or control parameter for adjusting the molar H$_2$:CO ratio of the synthesis gas product over a wide range of CO$_2$-steam reforming conditions. In fact, for any given set of such conditions (e.g., conditions within the reactor such as temperature, pressure, weight hourly space velocity, and catalyst formulation) under which the combined CO$_2$ and steam reforming reactions are carried out, a relationship can be established between the molar H$_2$O:CO$_2$ ratio of the gaseous mixture (e.g., combined reactor feed) and the molar H$_2$:CO ratio of the synthesis gas product (e.g., reactor effluent). Whereas the dry reforming and steam reforming of hydrocarbons other than methane produce H$_2$ and CO at other molar ratios, directionally the same shifts or adjustments in product yields may be achieved by varying the relative amounts of the oxidants H$_2$O and CO$_2$ in the gaseous mixture that is subjected to CO$_2$-steam reforming. Accordingly, embodiments of the invention are directed to a CO$_2$-steam reforming process comprising determining a molar H$_2$:CO ratio of the synthesis gas product and, based on the molar H$_2$:CO ratio, adjusting a molar H$_2$O:CO$_2$ ratio of the gaseous mixture toward a target molar H$_2$:CO ratio of the synthesis gas product, for example a target molar H$_2$:CO ratio of 2:1, or otherwise a target molar H$_2$:CO ratio range generally from about 1.5:1 to about 2.5:1, typically from about 1.5:1 to about 2.3:1, and often from about 1.8:1 to about 2.2:1.

More specifically, the molar H$_2$O:CO$_2$ ratio of the gaseous mixture may be increased to increase, toward the target molar H$_2$:CO ratio, an observed molar H$_2$:CO ratio of the synthesis gas product that is below the target. Conversely, the molar H$_2$O:CO$_2$ ratio of the gaseous mixture may be decreased to decrease, toward the target molar H$_2$:CO ratio, an observed molar H$_2$:CO ratio of the synthesis gas product that is above the target. Any such adjustments to the molar H$_2$O:CO$_2$ ratio of the gaseous mixture may be performed, for example, by adjusting the flow rate(s) of one or more components of the gaseous mixture (e.g., combined feed), such as one or more of a methane-containing feedstock (or hydrocarbon-containing feedstock generally), a CO$_2$-containing oxidant, and an H$_2$O-containing oxidant, relative to the flow rate(s) of one or more other of such components. According to a specific example, the molar H$_2$O:CO$_2$ ratio of the combined feed to the reactor may be increased or decreased, by increasing or decreasing, respectively, the flow rate of steam (as the H$_2$O-containing oxidant), thereby resulting in a respective increase or decrease in the molar H$_2$O:CO$_2$ ratio of the gaseous mixture.

In addition to providing the ability to control the molar H$_2$:CO ratio of the synthesis gas product over a favorable range of values, the use of steam (H$_2$O) as an oxidant in combination with CO$_2$ furthermore surprisingly reduces the rate of carbon (coke) formation compared to pure dry reforming, thereby extending the life of catalysts as described herein. Accordingly, further embodiments of the invention are directed to a CO$_2$-steam reforming process in which the rate of carbon formation (e.g., using suitable ratios or concentrations/partial pressures of CO$_2$ and H$_2$O oxidants, in combination with a catalyst as described herein) is less than the rate of carbon formation of a baseline process (i.e., baseline dry reforming process), in which all parameters are maintained the same, except for the replacement of H$_2$O in the gaseous mixture (e.g., combined reactor feed) with an equimolar amount of oxygen as CO$_2$ (i.e., replacement of the moles of H$_2$O with ½ the moles of CO$_2$). Coupled with this comparatively lower carbon formation relative to the baseline process, the synthesis gas product may have a molar H$_2$/CO ratio as described herein (e.g., from about 1.5:1 to about 2.3:1).

Catalysts as described herein furthermore exhibit a surprising degree of sulfur tolerance, which is particularly advantageous, for example, in the case of methane-containing feedstocks comprising or derived from natural gas that, depending on its source, may contain a significant concentration (e.g., several weight percent by volume or more) of H$_2$S. In this regard, conventional steam methane reforming (SMR) processes require pretreatment to reduce the feed total sulfur content to typically less than 1 mol-ppm to protect the catalyst from sulfur poisoning. In contrast, according to representative embodiments of the present invention, the gaseous mixture or any of its components, particularly the hydrocarbon-containing feedstock, is not subjected to, or otherwise has not undergone, a sulfur removal pretreatment step. Such embodiments provide substantial economic benefits over known processes with stringent desulfurization requirements and associated expenses, as necessary to achieve favorable catalyst life. In contrast to such known processes, a gaseous mixture in a dry reforming or CO$_2$-steam reforming process as described herein may comprise sulfur generally at any concentration representative of the source of the hydrocarbon feedstock, such as natural gas, not having undergone pretreatment for sulfur removal, but also accounting for the potential dilution of the sulfur when combined with other components of the gaseous mixture (e.g., CO$_2$) having a lower sulfur concentration. For example, the gaseous mixture may comprise generally at least about 1 mole-ppm (e.g., from about 1 mol-ppm to about 10 mol-%) total sulfur (e.g., as H$_2$S and/or other sulfur-bearing contaminants). The gaseous mixture may comprise typically at least about 10 mol-ppm (e.g., from about 10 mol-ppm to about 1 mol-%) and often at least about 100 mol-ppm (e.g., from about 100 mol-ppm to about 1000 mol-ppm) of total sulfur. For example, a range from about 500 mol-ppm to about 1000 mol-ppm of total sulfur, according to particular embodiments, generally poses no, or at least a negligible, adverse effect on the stability of reforming catalysts as described herein.

With respect to sulfur tolerance of catalysts described herein, further aspects of the invention are associated with the discovery that higher levels (concentrations) of sulfur in the gaseous mixture may be compensated for by increasing the reaction temperature, i.e., temperature of the bed of catalyst as described herein, contained in a reactor. That is, increased sulfur concentrations have been found to impact catalyst activity, as measured by decreased conversion of methane and/or or other hydrocarbon(s) in the gaseous mixture, if all other operating parameters remain unchanged. However, the desired conversion level can be restored by increasing the reaction temperature. For example, under certain operating conditions, a 28° C. (50° F.) increase can be sufficient to restore a loss in catalyst activity that accompanies a concentration of 800 mol-ppm H$_2$S in the gaseous mixture, relative to the activity without any sulfur in the gaseous mixture. Accordingly, embodiments of the invention are directed to a dry reforming process or a CO$_2$-steam reforming process as described herein comprising determining a conversion of methane and/or other hydrocarbon(s) (e.g., a conversion of combined C$_1$-C$_4$ hydrocarbons or combined C$_1$-C$_3$ hydrocarbons), or otherwise determining a sulfur level (such as an H$_2$S level) in the gaseous mixture or synthesis gas product and, based on the conversion or sulfur level, adjusting the reaction temperature toward a target conversion of methane and/or other hydrocarbon(s), for example a target conversion of at least about 75% (e.g., any specific conversion value in the range from about 75% to about 100%), such as a target conversion of at least about 85% (e.g., any specific conversion value in the range from about 85% to about 99%).

Importantly, however, such decreases in the activity of catalysts described herein, accompanying increases in the concentration of sulfur in the gaseous mixture, are not further accompanied by any appreciable loss in catalyst stability. That is, the compensating reactor temperature increases, as described herein to offset higher sulfur levels, do not significantly impact the ability of the catalyst to achieve stable operating performance over an extended period. This finding is contrary to expectations based on conventional reforming technologies, in which the presence of even small quantities (e.g., mol-ppm levels) of sulfur in feeds must be prevented to avoid deactivation and costly premature replacement of the catalyst. A characteristic sulfur tolerance, or activity stability in the presence of sulfur-bearing contaminants, of catalysts as described herein can be determined according to a standard test in which a small, 5-100 gram catalyst sample is loaded into a fixed-bed reactor and contacted with a feed blend of 30 mol-% methane, 30 mol-% $CO_2$, and 30 mol-% $H_2O$ that is spiked with 800 mol-ppm of $H_2S$. In this standard test, with flowing conditions of 0.7 $hr^{-1}$ WHSV, a catalyst bed temperature of 788° C. (1450° F.), and a reactor pressure of 138 kPa (20 psig), a conversion of the methane of at least 85%, and preferably at least 95%, is maintained, at constant catalyst bed temperature, for at least 50 hours of operation, and more typically for at least 100 hours of operation, or even for at least 400 hours of operation.

The tolerance, or "robustness" of catalysts described herein is further manifested in a high stability against deactivation in the presence of other compounds in the gaseous mixture, including higher molecular weight hydrocarbons such as reactive aromatic hydrocarbons and/or olefinic hydrocarbons that are normally considered prone to causing catalyst deactivation through coking. For example, the gaseous mixture may comprise aromatic and olefinic hydrocarbons in a combined amount of generally at least about 1 mole-% (e.g., from about 1 mol-% to about 25 mol-%), such as at least about 3 mol-% (e.g., from about 3 mol-% to about 20 mol-%) or more particularly at least about 5 mol-% (e.g., from about 5 mol-% to about 15 mol-%). At such levels of aromatic and/or olefinic hydrocarbons, catalyst stability may be exhibited according to the same activity stability test as defined above with respect to sulfur tolerance, with the exception of the feed blend containing these concentrations of aromatic and/or olefinic hydrocarbons as opposed to $H_2S$. This tolerance of catalysts as described herein with respect to both sulfur and reactive hydrocarbons allows for the reforming of wide-ranging hydrocarbon-containing feedstocks, including various fractions (e.g., naphtha and jet fuel) obtained from crude oil refining as described in greater detail below.

More generally, the gaseous mixture, and particularly the hydrocarbon-containing feedstock component of this mixture, may comprise, in addition to methane, other hydrocarbons such as $C_2$, $C_3$, and/or $C_4$ hydrocarbons (e.g., ethane, propane, propylene, butane, and/or butenes) that may be present in natural gas and/or other sources of methane). Alternatively, catalysts as described herein may be used for dry reforming or $CO_2$-steam reforming of predominantly, or only, higher molecular weight hydrocarbons, such as in the case of the hydrocarbons in gaseous mixture comprising, or optionally consisting of, any one or more compounds selected from the group consisting of a $C_4$ hydrocarbon, a $C_5$ hydrocarbon, a $C_6$ hydrocarbon, a $C_7$ hydrocarbon, a $C_8$ hydrocarbon, a $C_9$ hydrocarbon, a $C_{10}$ hydrocarbon, a $C_{11}$ hydrocarbon, a $C_{12}$ hydrocarbon, a $C_{13}$ hydrocarbon, a $C_{14}$ hydrocarbon, a $C_{15}$ hydrocarbon, a $C_{16}$ hydrocarbon, a $C_{17}$ hydrocarbon, a $C_{18}$ hydrocarbon, and combinations thereof. For example, the hydrocarbons in the gaseous mixture may comprise, or consist of, $C_4$-$C_8$ or $C_4$-$C_6$ hydrocarbons, in the case of dry reforming or $CO_2$-steam reforming of naphtha boiling-range hydrocarbons (naphtha reforming). As another example, the hydrocarbons in the gaseous mixture may comprise, or consist of, $C_8$-$C_{18}$ or $C_8$-$C_{14}$ hydrocarbons, in the case of dry reforming or $CO_2$-steam reforming of jet fuel boiling-range hydrocarbons (jet fuel reforming). Such naphtha boiling-range hydrocarbons and jet fuel boiling-range fractions are normally obtained as products from crude oil refining and, as such, can be a source of sulfur-bearing contaminants in the gaseous mixture. In representative embodiments, the gaseous mixture may comprise methane and/or any of the hydrocarbons described herein in a combined amount generally from about 5 mol-% to about 85 mol-%, typically from about 10 mol-% to about 65 mol-%, and often from about 20 mol-% to about 45 mol-%. The gaseous mixture may further comprise $CO_2$ in an amount generally from about 8 mol-% to about 90 mol-%, typically from about 15 mol-% to about 75 mol-%, and often from about 20 mol-% to about 50 mol-%. In the case of $CO_2$-steam reforming, the gaseous mixture may comprise $H_2O$ in an amount generally from about 15 mol-% to about 70 mol-%, typically from about 20 mol-% to about 60 mol-%, and often from about 25 mol-% to about 55 mol-%. The balance of the gaseous mixture may include contaminants such as $H_2S$ and/or other sulfur-bearing contaminants as described above.

In the case of gaseous mixtures comprising methane and/or light hydrocarbons (e.g., $C_2$-$C_3$ or $C_2$-$C_4$ hydrocarbons), the synthesis gas product of dry reforming or $CO_2$-steam reforming may advantageously be used with a favorable molar $H_2$:CO ratio in the downstream production of liquid hydrocarbon fuels through Fischer-Tropsch synthesis, as described above. The synthesis gas may alternatively be used for other downstream applications associated with conventional steam methane reforming (SMR). For example, Tarun (INTERNATIONAL JOURNAL OF GREENHOUSE GAS CONTROL I (2007): 55-61) describes a conventional hydrogen production process involving SMR. If dry reforming or $CO_2$-steam reforming, as described herein, is applied in hydrogen production, according to embodiments of the invention, representative processes may further comprise steps of (i) subjecting the synthesis gas product to one or more water-gas shift (WGS) reaction stages to increase its hydrogen content and/or (ii) separating the effluent of the WGS stage(s), or otherwise separating the synthesis gas product without intervening WGS stage(s), as the case may be (e.g., by pressure-swing adsorption (PSA) or membrane separation), to provide a hydrogen-enriched product stream and a hydrogen-depleted PSA tail gas stream. The hydrogen-enriched product stream may then be used in a conventional refinery process such as a hydrotreating process (e.g., hydrodesulfurization, hydrocracking, hydroisomerization, etc.). The hydrogen-depleted PSA tail gas stream may then be separated to recover hydrogen and/or used as combustion fuel to satisfy at least some of the heating requirements of the dry reforming or $CO_2$-steam reforming. In yet further embodiments, the CO- and $H_2$-containing PSA tail gas may be passed to a biological fermentation stage for the production of fermentation products such as alcohols (e.g., ethanol). The gaseous effluent from the fermentation stage may then be separated to recover hydrogen and/or used as combustion fuel as described above. With respect to conventional hydrogen production, the further integration of a biological fermentation stage is described, for example, in U.S. Pat. Nos. 9,605,286; 9,145,300; US 2013/0210096; and US 2014/0028598. As an alternative to integration in a hydrogen production process, dry reforming or $CO_2$-steam reforming as described herein may be used to provide a synthesis gas product that is used directly in the downstream production of fermentation products using suitable carboxydotrophic bacteria (e.g., of the species *Clostridium autoethanogenum* or *Clostridium ljungdahlii*). In either case, i.e., with or without such integration, the microorganisms used for the fermentation may be sulfur tolerant or even require sulfur in the cell culture medium, such that the sulfur tolerance of catalysts as described herein can be particularly advantageous over conventional reforming catalysts, in terms of compatibility and cost savings associated with the elimination of, or at the least reduced requirements for, upstream sulfur removal.

Aspects of the invention therefore relate to dry reforming processes and $CO_2$-steam reforming processes for producing a synthesis gas product (i.e., comprising both $H_2$ and CO, and optionally other gases such as unconverted $CO_2$, $H_2O$, and/or hydrocarbons). In representative embodiments, a gaseous mixture comprising methane and/or other hydrocarbon(s) may be provided batchwise, but preferably as a continuous flow, to a reactor of a dry reforming process (in the case of the feed or gaseous mixture further comprising $CO_2$ but no water) or a $CO_2$-steam reforming process (in the case of the feed or gaseous mixture further comprising both $CO_2$ and water). A synthesis gas product, in turn, may be withdrawn batchwise (if the gaseous mixture is provided batchwise), but preferably as a continuous flow (if the gaseous mixture is provided as a continuous flow), from the reactor.

In addition to $H_2$, CO, and optionally other gases, water ($H_2O$) may also be present in the synthesis gas product, although at least a portion of the water that is present in vapor form may be readily separated by cooling/condensation, for example upstream of a Fischer-Tropsch synthesis reactor (FT reactor) used to convert the synthesis gas product to liquid hydrocarbons. Neither water nor $CO_2$ in the synthesis gas product has an effect on its molar $H_1CO$ ratio which, as described above, is an important parameter in determining the suitability of the synthesis gas product as a direct feed stream to the FT reactor.

In representative processes, a gaseous mixture comprising methane and/or other light hydrocarbon(s) (e.g., ethane, ethylene, propane, and/or propylene) and $CO_2$, as well as optionally $H_2O$, is contacted with a catalyst having activity for carrying out the reforming of such hydrocarbon(s). In particular, such hydrocarbon(s), for example the majority of such hydrocarbons, may be reformed (i) through their oxidation with some or all of the $CO_2$ only, according to a dry reforming process, or (ii) through their oxidation with both some or all of the $CO_2$ and some or all of the $H_2O$ (if present), according to a $CO_2$-steam reforming process.

As described above, aspects of the invention are associated with the discovery of reforming catalysts for such dry reforming and $CO_2$-steam reforming processes, exhibiting important advantages, particularly in terms of sulfur tolerance and/or a reduced rate of carbon formation (coking), compared to conventional reforming catalysts. These characteristics, in turn, reduce the rate of catalyst deactivation through poisoning and/or coking mechanisms that chemically and/or physically block active catalyst sites. Further improvements in catalyst stability result at least in part from the high activity of catalysts described herein, as necessary to lower the substantial activation energy barrier associated with the use of $CO_2$ as an oxidant for methane and/or other hydrocarbon(s), as described above. This high activity manifests in lower operating (reactor or catalyst bed) temperatures, which further contribute to the reduced rate of carbon deposition (coke formation) on the catalyst surface and extended, stable operation. According to particular embodiments, processes utilizing catalysts described herein can maintain stable operating parameters as described herein, for example in terms of hydrocarbon conversion (e.g., at least about 85% conversion of methane and/or other hydrocarbon(s)) and/or molar $H_2/CO$ ratio (e.g., from about 1.5:1 to about 2.3:1) of the synthesis gas product, for at least about 100, at least about 300, or even at least about 500, hours of continuous or possibly discontinuous operation. This may be an operating period over which (i) the catalyst does not undergo regeneration, for example according to a reforming process utilizing the catalyst as a fixed bed within the reactor and/or (ii) the temperature of the reactor or catalyst bed is not raised beyond a threshold temperature difference from the start of the time period to the end of the time period, with this threshold temperature difference being, for example, 100° C. (180° F.), 50° C. (90° F.), 25° C. (45° F.), 10° C. (18° F.), or even 5° C. (9° F.).

Representative reforming catalysts suitable for catalyzing the reaction of methane and/or other hydrocarbon(s) with $CO_2$ and optionally also with $H_2O$ comprise a noble metal, and possibly two or more noble metals, on a solid support. The phrase "on a solid support" is intended to encompass catalysts in which the active metal(s) is/are on the support surface and/or within a porous internal structure of the support. The solid support preferably comprises a metal oxide, with cerium oxide being of particular interest. Cerium oxide may be present in an amount of at least about 80 wt-% and preferably at least about 90 wt-%, based on the weight of the solid support (e.g., relative to the total amount(s) of metal oxide(s) in the solid support). The solid support may comprise all or substantially all (e.g., greater than about 95 wt-%) cerium oxide. Other metal oxides, such as aluminum oxide, silicon oxide, titanium oxide, zirconium oxide, magnesium oxide, strontium oxide, etc., may also be present in the solid support, in combined amounts representing a minor portion, such as less than about 50 wt-%, less than about 30 wt-%, or less than about 10 wt-%, of the solid support. In other embodiments, the solid support may comprise such other metal oxides alone or in combination, with a minor portion (e.g., less than about 50 wt-% or less than about 30 wt-%) of cerium oxide.

Noble metals are understood as referring to a class of metallic elements that are resistant to oxidation. In representative embodiments, the noble metal, for example at least two noble metals, of the catalyst may be selected from the group consisting of platinum (Pt), rhodium (Rh), ruthenium (Ru), palladium (Pd), silver (Ag), osmium (Os), iridium (Ir), and gold (Au), with the term "consisting of" being used merely to denote group members, according to a specific embodiment, from which the noble metal(s) are selected, but not to preclude the addition of other noble metals and/or other metals generally. Accordingly, a catalyst comprising a noble metal embraces a catalyst comprising at least two noble metals, as well as a catalyst comprising at least three noble metals, and likewise a catalyst comprising two noble metals and a third, non-noble metal such as a promoter metal (e.g., a transition metal). According to preferred embodiments, the noble metal is present in an amount, or alternatively the at least two noble metals are each independently present in amounts, from about 0.05 wt-% to about 5 wt-%, from about 0.3 wt-% to about 3 wt-%, or from about 0.5 wt-% to about 2 wt-%, based on the weight of the catalyst. For example, a representative catalyst may comprise the two noble metals Pt and Rh, and the Pt and Rh may independently be present in an amount within any of these ranges (e.g., from about 0.05 wt-% to about 5 wt-%). That is, either the Pt may be present in such an amount, the Rh may be present in such an amount, or both Pt and Rh may be present in such amounts.

In representative embodiments, the at least two noble metals (e.g., Pt and Rh) may be substantially the only noble metals present in the catalyst, such that, for example, any other noble metal(s) is/are present in an amount or a combined amount of less than about 0.1 wt-%, or less than about 0.05 wt-%, based on the weight of the catalyst. In further representative embodiments, that at least two noble metals (e.g., Pt and Rh) are substantially the only metals present in the catalyst, with the exception of metals present in the solid support (e.g., such as cerium being present in the solid support as cerium oxide). For example, any other metal(s), besides at least two noble metals and metals of the solid support, may be present in an amount or a combined amount of less than about 0.1 wt-%, or less than about 0.05 wt-%, based on the weight of the catalyst. Any metals present in the catalyst, including noble metal(s), may have a metal particle size in the range generally from about 0.3 nanometers (nm) to about 20 nm, typically from about 0.5 nm to about 10 nm, and often from about 1 nm to about 5 nm.

The noble metal(s) may be incorporated in the solid support according to known techniques for catalyst preparation, including sublimation, impregnation, or dry mixing. In the case of impregnation, which is a preferred technique, an impregnation solution of a soluble compound of one or more of the noble metals in a polar (aqueous) or non-polar (e.g., organic) solvent may be contacted with the solid support, preferably under an inert atmosphere. For example, this contacting may be carried out, preferably with stirring, in a surrounding atmosphere of nitrogen, argon, and/or helium, or otherwise in a non-inert atmosphere, such as air. The solvent may then be evaporated from the solid support, for example using heating, flowing gas, and/or vacuum conditions, leaving the dried, noble metal-impregnated support. The noble metal(s) may be impregnated in the solid support, such as in the case of two noble metals being impregnated simultaneously with both being dissolved in the same impregnation solution, or otherwise being impregnated separately using different impregnation solutions and contacting steps. In any event, the noble metal-impregnated support may be subjected to further preparation steps, such as washing with the solvent to remove excess noble metal(s) and impurities, further drying, calcination, etc. to provide the catalyst.

The solid support itself may be prepared according to known methods, such as extrusion to form cylindrical particles (extrudates) or oil dropping or spray drying to form spherical particles. Regardless of the specific shape of the solid support and resulting catalyst particles, the amounts of noble metal(s) being present in the catalyst, as described above, refer to the weight of such noble metal(s), on average, in a given catalyst particle (e.g., of any shape such as cylindrical or spherical), independent of the particular distribution of the noble metals within the particle. In this regard, it can be appreciated that different preparation methods can provide different distributions, such as deposition of the noble metal(s) primarily on or near the surface of the solid support or uniform distribution of the noble metal(s) throughout the solid support. In general, weight percentages described herein, being based on the weight of the solid support or otherwise based on the weight of catalyst, can refer to weight percentages in a single catalyst particle but more typically refer to average weight percentages over a large number of catalyst particles, such as the number in a reactor that form a catalyst bed as used in processes described herein.

Simplified illustrations of dry reforming processes and optionally $CO_2$-steam reforming processes 10 are depicted in FIGS. 1A and 1B. In either of these embodiments, gaseous mixture 4 comprising one or more hydrocarbons (e.g., methane) and $CO_2$, may reside within reactor 5 in the form of a vessel that is used to contain a bed of catalyst 6, as described above, under reforming conditions at which gaseous mixture 4 and catalyst 6 are contacted. According to the embodiment illustrated in FIG. 1A, gaseous mixture 4 may be provided within reactor 5 from hydrocarbon-containing feedstock 1 alone. For example, a representative hydrocarbon-containing feedstock is a methane-containing feedstock that is obtained from biomass gasification or pyrolysis, including hydrogasification or hydropyrolysis, and may further comprise $CO_2$ and $H_2O$. Such a hydrocarbon-containing feedstock may thereby itself provide gaseous mixture 4 for a $CO_2$-steam reforming process, in which both $CO_2$ and $H_2O$ react as oxidants of methane. In other embodiments, gaseous mixture 4 may be obtained from combining hydrocarbon-containing feedstock 1 with optional $CO_2$-containing oxidant 2, if, for example, hydrocarbon-containing feedstock 1 contains little $CO_2$ such as in the case of liquid hydrocarbons including naphtha boiling-range hydrocarbons and/or jet fuel boiling-range hydrocarbons, or otherwise in the case of some types of natural gas.

As another option, $H_2O$-containing oxidant 3 (e.g., as steam) may also be combined to form gaseous mixture 4, comprising methane and both $CO_2$ and $H_2O$ oxidants for a $CO_2$-steam reforming processes. Again, however, $H_2O$ may also be present in sufficient quantity in hydrocarbon-containing feedstock 1 and/or $CO_2$-containing oxidant 2, such that separate $H_2O$-containing oxidant 3 may not be necessary. As shown by dashed, double-headed arrows between hydrocarbon-containing feedstock 1, $CO_2$-containing oxidant 2, and $H_2O$-containing oxidant 3, it is clear that any of these may be combined prior to (e.g., upstream of) reactor 5. According to a specific embodiment, FIG. 1B illustrates hydrocarbon-containing feedstock 1 being combined with optional $CO_2$-containing oxidant 2 and optional $H_2O$-containing oxidant 3 to provide gaseous mixture 4 both prior to (e.g., upstream of) reactor 5, as well as within this reactor.

As described above, in embodiments in which gaseous mixture 4 comprises one or more hydrocarbons such as methane and $CO_2$, but not $H_2O$, the process may be considered a "dry reforming" process, whereas in embodiments in which gaseous mixture 4 comprises hydrocarbon(s) and $CO_2$, and further comprises $H_2O$ acting, in combination with the $CO_2$, as oxidants of the hydrocarbon(s) (e.g., such that at least respective oxidant portions of the $CO_2$ and $H_2O$ oxidize respective reactant portions of the hydrocarbon(s)), the process may be considered a "$CO_2$-steam reforming process." Catalysts as described herein provide advantageous results in both dry reforming and $CO_2$-steam reforming, in terms of both activity and stability, as described above. Under reforming conditions provided in reactor 5, gaseous mixture 4 is converted to synthesis gas product 7, which may, relative to gaseous mixture 4, be enriched in (i.e., have a higher concentration of) hydrogen and CO, and/or be depleted in (i.e., have a lower concentration of) $CO_2$, $H_2O$, methane, and/or other hydrocarbon(s) initially present in gaseous mixture 4.

An important methane-containing feedstock is natural gas, and particularly stranded natural gas, which, using known processes, is not easily converted to a synthesis gas product in an economical manner. Natural gas comprising a relatively high concentration of $CO_2$, for example at least about 10 mol-% or even at least about 25 mol-%, represents an attractive methane-containing feedstock, since processes as described herein do not require the removal of $CO_2$ (e.g., by scrubbing with an amine solution), in contrast to conventional steam reforming, and in fact utilize $CO_2$ as a reactant. Other methane-containing feedstocks may comprise methane obtained from coal or biomass (e.g., lignocellulose or char) gasification, from a biomass digester, or as an effluent from a renewable hydrocarbon fuel (biofuel) production process (e.g., a pyrolysis process, such as a hydropyrolysis processes, or a fatty acid/triglyceride hydroconversion processes). Further methane-containing feedstocks may comprise methane obtained from a well head or an effluent of an industrial process including a petroleum refining process (as a refinery off gas), an electric power production process, a steel manufacturing process or a non-ferrous manufacturing process, a chemical (e.g., methanol) production process, or a coke manufacturing process. Generally, any process gas known to contain a hydrocarbon (e.g., a $C_1$-$C_3$ hydrocarbon) and $CO_2$ may provide all or a portion of the gaseous mixture as described herein, or at least all or a portion of the methane-containing feedstock as a component of this mixture. If the methane-containing feedstock comprises methane obtained from a renewable resource (e.g., biomass), for example methane from a process stream obtained by hydropyrolysis as described in U.S. Pat. No. 8,915,981 assigned to Gas Technology Institute, then processes described herein may be used to produce renewable synthesis gas products (i.e., comprising renewable CO) that, in turn, can be further processed to provide renewable hydrocarbon-containing fuels, fuel blending components, and/or chemicals. Accordingly, the methane-containing feedstock may therefore comprise methane from a non-renewable source (e.g., natural gas) and/or methane from a renewable source (e.g., biomass), with the latter source imparting an overall reduction in the carbon footprint associated with the synthesis gas product and downstream products. As further described herein, natural gas and/or other methane-containing feedstocks may be, but need not be, pretreated to remove $H_2S$ and other sulfur-bearing contaminants, prior to dry reforming or $CO_2$-steam reforming.

In representative embodiments, gaseous mixture 4 comprising a hydrocarbon and $CO_2$ may be contacted with catalyst 6 in a batchwise or discontinuous operation, but preferably the dry reforming or $CO_2$-steam reforming process is performed continuously with flowing streams of the gaseous mixture 4 or components thereof (e.g., hydrocarbon-containing feedstock 1, $CO_2$-containing oxidant 2, and/or $H_2O$-containing oxidant 3 as described herein), to improve process efficiency. For example, contacting may be performed by continuously flowing the gaseous mixture 4 (e.g., as a combined reactor feed stream of any of these components in combination) through the reactor 5 and catalyst 6 under reforming conditions (e.g., conditions within a reactor vessel and within a bed of the catalyst that is contained in the vessel) that include a suitable flow rate. In particular embodiments, the reforming conditions may include a weight hourly space velocity (WHSV) generally from about 0.05 $hr^{-1}$ to about 10 $hr^{-1}$, typically from about 0.1 $hr^{-1}$ to about 4.0 $hr^{-1}$, and often from about 0.3 $hr^{-1}$ to about 2.5 $hr^{-1}$. As is understood in the art, the WHSV is the weight flow of the gaseous mixture divided by the weight of the catalyst in the reactor and represents the equivalent catalyst bed weights of the feed stream processed every hour. The WHSV is related to the inverse of the reactor residence time. The catalyst 6 may be contained within reactor 5 in the form of a fixed bed, but other catalyst systems are also possible, such as moving bed and fluidized bed systems that may be beneficial in processes using continuous catalyst regeneration.

Other reforming conditions, which are useful for either dry reforming or $CO_2$-steam reforming, include a temperature generally from about 649° C. (1200° F.) to about 816° C. (1500° F.). Processes described herein, by virtue of the high activity of the catalyst in terms of reducing the activation energy barrier required for the use of $CO_2$ as an oxidant, can effectively oxidize methane and/or other hydrocarbons at significantly lower temperatures, compared to a representative conventional temperature of 816° C. (1500° F.) that is used for dry reforming or steam reforming. For example, in representative embodiments, the reforming conditions can include a temperature in a range from about 677° C. (1250° F.) to about 788° C. (1450° F.), or from about 704° C. (1300° F.) to about 760° C. (1400° F.). As described above, the presence of $H_2S$ and/or other sulfur-bearing contaminants in significant amounts (e.g., 100-1000 mol-ppm) may warrant increased temperatures, for example in a range from about 732° C. (1350° F.) to about 843° C. (1550° F.), or from about 760° C. (1400° F.) to about 816° C. (1500° F.), to maintain desired conversion levels (e.g., greater than about 85%). Yet other reforming conditions can include an above-ambient pressure, i.e., a pressure above a gauge pressure of 0 kPa (0 psig), corresponding to an absolute pressure of 101 kPa (14.7 psia). Because the reforming reactions make a greater number of moles of product versus moles of reactant, equilibrium is favored at relatively low pressures. Therefore, reforming conditions can include a gauge pressure generally from about 0 kPa (0 psig) to about 517 kPa (75 psig), typically from about 0 kPa (0 psig) to about 345 kPa (50 psig), and often from about 103 kPa (15 psig) to about 207 kPa (30 psig).

Advantageously, within any of the above temperature ranges, the high activity of the catalyst can achieve a conversion of methane and/or other hydrocarbon(s) (e.g., a conversion of methane, a conversion of combined $C_1$-$C_3$ hydrocarbons, a conversion of combined $C_1$-$C_4$ hydrocarbons, a conversion of naphtha boiling-range hydrocarbons, a conversion of jet fuel boiling-range hydrocarbons, etc.) of at least about 80% (e.g., from about 80% to about 99%), at least about 85% (e.g., from about 85% to about 97%), or at least about 90% (e.g., from about 90% to about 99%), for example by adjusting the particular reactor or catalyst bed temperature and/or other reforming conditions (e.g., WHSV and/or pressure) as would be appreciated by those having skill in the art, with knowledge gained from the present disclosure. Advantageously, catalysts as described herein are sufficiently active to achieve a significant hydrocarbon (e.g., methane) conversion, such as at least about 85%, in a stable manner at a temperature of at most about 732° C. (1350° F.), or even at most about 704° C. (1300° F.). With respect to the oxidant reactants, a representative conversion of $CO_2$ is at least about 50% (e.g., from about 50% to about 75%), and a representative conversion of $H_2O$ is at least about 70% (e.g., from about 70% to about 90%), at the conversion levels described herein with respect to hydrocarbon(s). As is understood in the art, conversion of any particular compound (e.g., methane) or combination of compounds (e.g., $C_1$-$C_4$ hydrocarbons or $C_1$-$C_3$ hydrocarbons) can be calculated on the basis of:

$$100*(X_{feed}-X_{prod})/X_{feed},$$

wherein $X_{feed}$ is the total amount (e.g., total weight or total moles) of the compound(s) X in the gaseous mixture (e.g., combined reactor feed) provided to a reactor and $X_{prod}$ is the total amount of the compound(s) X in the synthesis gas product removed from the reactor. In the case of continuous processes, these total amounts may be more conveniently expressed in terms of flow rates, or total amounts per unit time (e.g., total weight/hr or total moles/hr). Other performance criteria that can be achieved using catalysts and reforming conditions as described herein include a high hydrogen yield, or portion of the total hydrogen in the methane and/or other hydrogen-containing compounds (e.g., total hydrogen in the hydrocarbons such as $C_2$-$C_4$ hydrocarbons or $C_2$-$C_3$ hydrocarbons), in the gaseous mixture provided to the reactor, which is converted to $H_2$ in the synthesis gas product removed from the reactor. In representative embodiments, the hydrogen yield is at least about 70% (e.g., from about 70% to about 85%). As described above with respect to conversion, amounts provided to and removed from the reactor may be expressed in terms of flow rates.

As described above, further advantages associated with reforming processes, and particularly $CO_2$-steam reforming processes, as described herein, include favorable molar $H_2$/CO ratios, as well as the ability to adjust these ratios, in the synthesis gas product. This has especially important implications for downstream processing via Fischer-Tropsch for the production of liquid hydrocarbons. The exact composition of the synthesis gas product depends on the composition of the feed (e.g., combined reactor feed) or gaseous mixture, the catalyst, and the reforming conditions.

In representative embodiments, the synthesis gas product, particularly in the case of a $CO_2$-steam reforming process, advantageously has a molar $H_2$:CO ratio that is near 2:1, for example generally in a range from about 1.5:1 to about 2.3:1, and typically from about 1.8:1 to about 2.2:1. The combined concentration of $H_2$, and CO in this product is generally at least about 35 mol-% (or vol-%) (e.g., from about 35 mol-% to about 85 mol-%), typically at least about 50 mol-% (e.g., from about 50 mol-% to about 80 mol-%), and often at least about 60 mol-% (e.g., from about 60 mol-% to about 75 mol-%). As described above, the balance of the synthesis gas product may be substantially or all $CO_2$ and water, depending on the particular dry reforming or $CO_2$-steam reforming process, including the conditions of such process (e.g., conditions within the reactor such as temperature, pressure, weight hourly space velocity, and catalyst formulation) and the feed or gaseous mixture being reacted. In representative embodiments, $CO_2$ is present in the synthesis gas product in a concentration of generally less than about 45 mol-% (e.g., from about 5 mol-% to about 45 mol-%) and typically less than about 35 mol-% (e.g., from about 10 mol-% to about 35 mol-%). Water may be present in a concentration of generally less than about 20 mol-% (e.g., from about 1 mol-% to about 25 mol-%) and typically less than about 15 mol-% (e.g., from about 5 mol-% to about 15 mol-%). Minor amounts of unconverted hydrocarbons may also be present in the synthesis gas product. For example, a combined amount of $C_1$-$C_4$ hydrocarbons (e.g., a combined amount of methane, ethane, propane, and butane), which may possibly include only $C_1$-$C_3$ hydrocarbons, may be present in a concentration of less than about 5 mol-% and typically less than about 2 mol-%.

The following examples are set forth as representative of the present invention. These examples are not to be construed as limiting the scope of the invention as other equivalent embodiments will be apparent in view of the present disclosure and appended claims.

EXAMPLE 1

Pilot plant scale experiments were performed in which gaseous mixtures were fed continuously to a reactor containing catalyst particles having a composition of 1 wt-% Pt and 1 wt-% Rh on a cerium oxide support. The performance of the system for $CO_2$-steam reforming was tested at conditions of 0.7 $hr^{-1}$ WHSV, 760° C. (1400° F.), and a gauge pressure ranging from 124 kPa (18 psig) to 172 kPa (25 psig). Two types of gaseous mixtures tested were (1) a composition containing methane, ethane, propane, and $CO_2$, in addition to $H_2O$, and simulating that obtained from the combined hydropyrolysis and hydroconversion of biomass ("Renewable Type"), and (2) a typical natural gas composition having a high level of $CO_2$ ("Natural Gas Type"). These gaseous mixtures (combined feeds), and the synthesis gas products obtained from these feeds, are summarized in Table 1 below.

TABLE 1

| | Renewable Type Combined Feed | Renewable Type Synthesis Gas Product | Natural Gas Type Combined Feed | Natural gas Type Synthesis Gas Product |
|---|---|---|---|---|
| methane, mol-% | 11.7 | 0.3 | 21.7 | .79 |
| ethane, mol-% | 5.8 | 0 | 5.8 | 0 |
| propane, mol-% | 5.8 | 0 | 1.4 | 0 |
| $CO_2$, mol-% | 23.4 | 10.6 | 29.0 | 8.2 |
| water, mol-% | 53.3 | 12.7 | 42.1 | 8.6 |
| $H_2$, mol-% | | 51.3 | | 51.9 |
| CO, mol-% | | 25.1 | | 30.4 |
| % methane conversion | | 96 | | 93 |
| % ethane conversion | | 100 | | 100 |
| % propane conversion | | 100 | | 100 |
| molar $H_2$:CO ratio | | 2.05 | | 1.71 |

Figure 2:
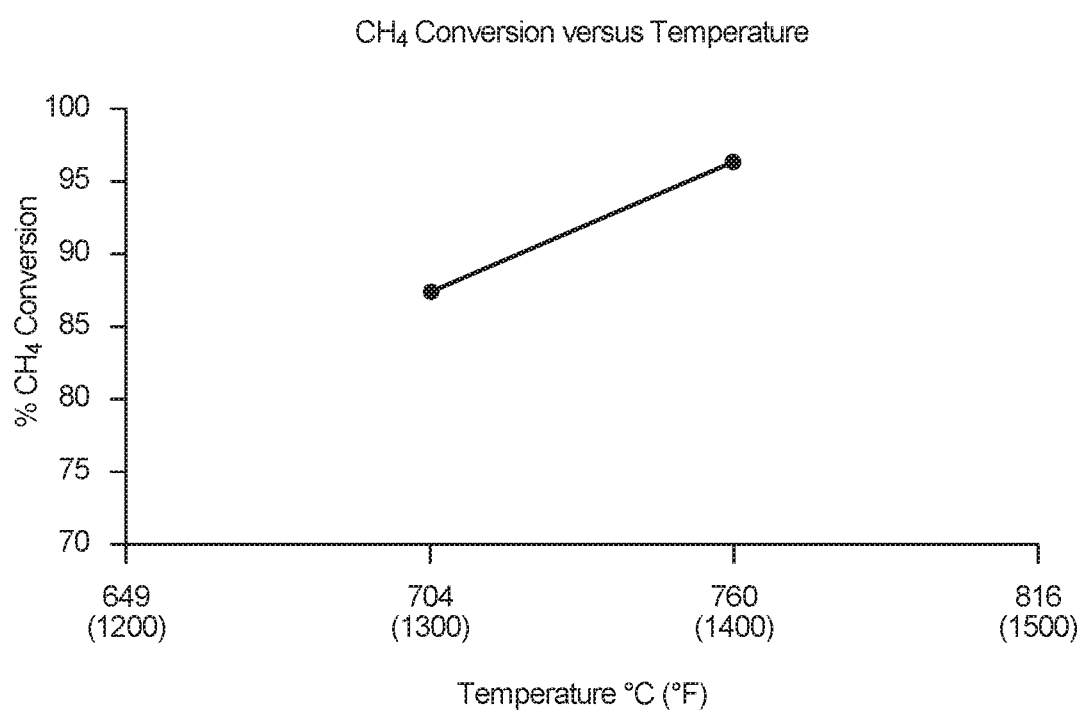
FIG. 2 illustrates the high activity, in terms of methane conversion, of catalysts as described herein.
Figure 3:
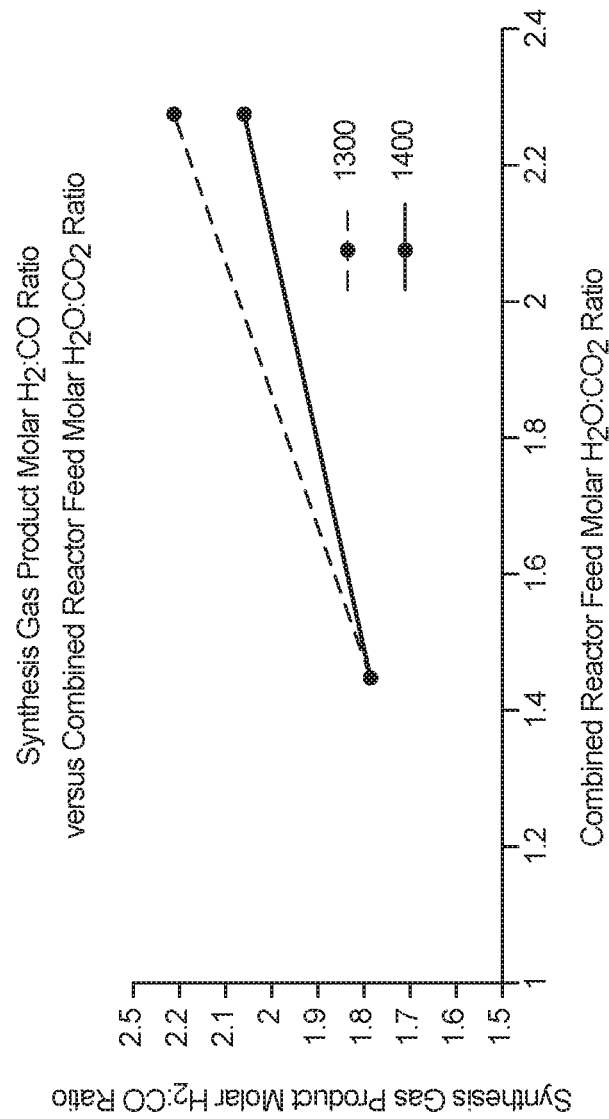
FIG. 3 illustrates the relationship between the molar $H_2$:CO ratio of the synthesis gas product and the molar $H_2O/CO_2$ ratio of the gaseous mixture in the reactor (as a combined feed) at different reaction temperatures, in the case of representative $CO_2$-steam reforming processes.

From these results, it can be seen that the $CO_2$-steam reforming catalyst and process can provide a synthesis gas product having a molar ratio that is nearly 2:1 and therefore suitable for subsequent, direct processing via the Fischer-Tropsch reaction, or at least without a prior (upstream) adjustment of this ratio. Whereas these favorable results were obtained at only 760° C. (1400° F.) reaction temperature, lower temperatures, such as 704° C. (1300° F.) are also possible, in view of the high activity of the catalyst. Lower operating temperatures directionally reduce the rate of side reactions that form coke, which deactivates the catalyst. FIG. 2 illustrates the relationship between temperature and methane conversion for feeds and catalysts of the type tested in Example 1, and in particular this figure illustrates the ability to achieve greater than 85% methane conversion at 704° C. (1300° F.) and greater than 95% methane conversion at 760° C. (1400° F.). FIG. 3 illustrates how the molar $H_2O$:$CO_2$ ratio of the gaseous mixture, for feeds and catalysts of the type tested in Example 1, influences the molar $H_2$:CO ratio of the synthesis gas product, at temperatures of both 704° C. (1300° F.) and 760° C. (1400° F.). In view of the possibility to establish relationships between these parameters for a given feed, catalyst, and set of operating conditions, the gaseous mixture composition can serve as a convenient control for achieving a target synthesis gas product composition.

EXAMPLE 2

Additional experiments were conducted in which a typical natural gas composition as described in Example 1 was subjected to $CO_2$-steam reforming as also described in this example. However, the gaseous mixture or combined feed in this case was spiked with $H_2S$ at a concentration of 800 mol-ppm. Despite this high level of sulfur contamination, it was found that the offset in methane conversion was easily restored by increasing the catalyst bed temperature from 760° C. (1400° F.) to 788° C. (1450° F.). Furthermore, the catalyst surprisingly exhibited long-term stability over 400 operating hours (hours on stream) at this temperature, as well as the WHSV and pressure as described above with respect to Example 1. This stability, achieved despite the considerable sulfur concentration, was surprising in view of the sulfur sensitivity of conventional catalysts used for steam methane reforming.

EXAMPLE 3

Figure 4:
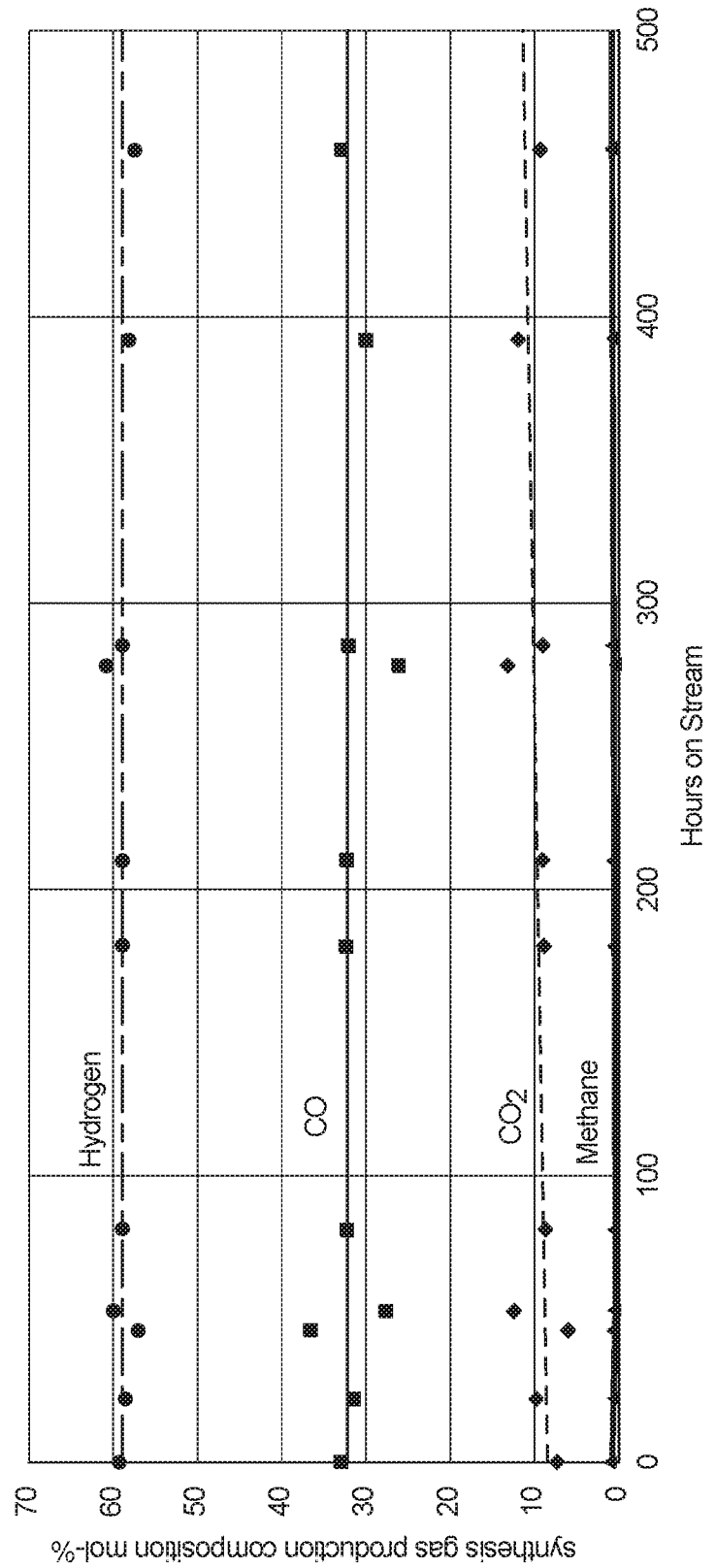
FIGS. 4 and 5 illustrate the long term operational stability of catalysts as described herein, in a $CO_2$-steam reforming process over an extended operating period.
Figure 5:
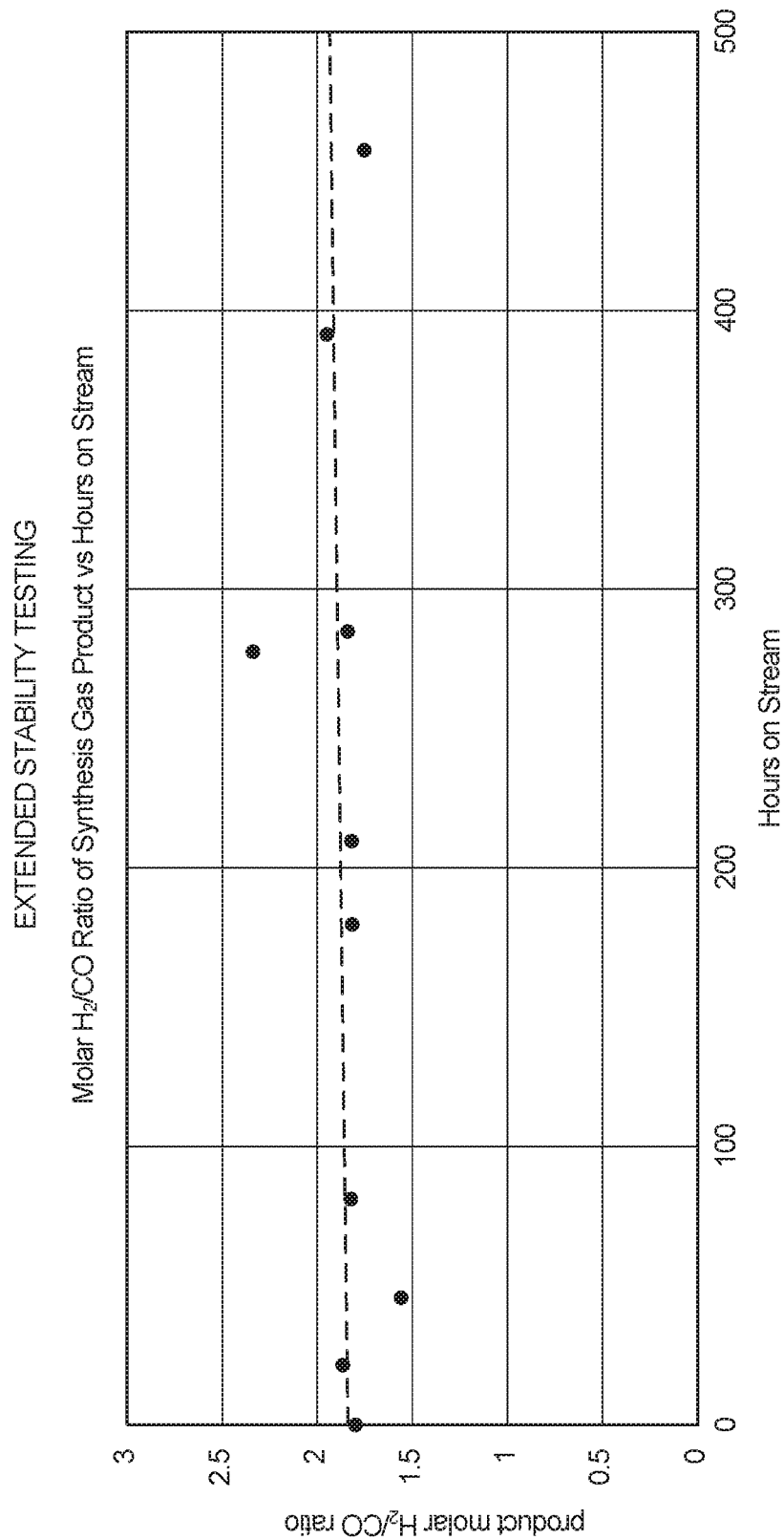

The gaseous mixture described in Example 1 as the "Renewable Type" and having the composition provided in Table 1 was tested using the catalyst and conditions as described in Example 1, to evaluate performance of the system for $CO_2$-steam reforming over an extended period of operation. Long-term stability testing revealed that the composition of the synthesis gas product obtained was stable over 500 hours of operation under these constant conditions, demonstrating essentially no deactivation, over the extended operating period, of the reforming catalyst. FIG. 4 illustrates the stable synthesis gas product composition obtained over this operating period, with a high level of conversion of methane. FIG. 5 illustrates the stable molar $H_2/CO$ ratio of the synthesis gas product obtained, which was nearly a ratio of 2 and therefore ideal for use in a downstream FT synthesis reaction to produce liquid hydrocarbons.

Overall, aspects of the invention relate to the use of dry reforming or $CO_2$-steam reforming to achieve high conversion of methane and/or other hydrocarbon(s) and produce a synthesis gas product having desired characteristics, including molar $H_2:CO$ ratios as described herein. Further aspects relate to such reforming processes that use an active catalyst with the ability to convert methane and/or other hydrocarbon(s) in the presence of $CO_2$, or both $CO_2$ and $H_2O$, with little coke deposition and high catalyst stability, even in the case of feeds comprising sulfur-bearing contaminants and/or reactive compounds such as aromatic and/or olefinic hydrocarbons, with such contaminants and compounds being associated with rapid deactivation in conventional catalyst systems. Yet further aspects relate to such reforming processes that also provide a straightforward approach for direct use with further processing stages, such as Fischer-Tropsch synthesis for the production of liquid ($C_4^+$) hydrocarbons and/or alcohols, alcohol synthesis via fermentation, or hydrogen production. Advantageously, the processes can utilize existing $CO_2$ present in sources of both renewable and non-renewable methane, preferably without the removal of this $CO_2$, and/or can utilize lower levels of water compared to conventional steam reforming of methane. In addition, the sulfur tolerance of the catalyst is further evidenced by its activity for converting sulfur-bearing contaminants into $SO_2$ and $H_2S$ that are easily managed downstream, if necessary, using a single acid gas removal step. Those having skill in the art, with the knowledge gained from the present disclosure, will recognize that various changes can be made to these processes in attaining these and other advantages, without departing from the scope of the present disclosure. As such, it should be understood that the features of the disclosure are susceptible to modifications and/or substitutions without departing from the scope of this disclosure. The specific embodiments illustrated and described herein are for illustrative purposes only, and not limiting of the invention as set forth in the appended claims.

The invention claimed is:

1. A process for producing a synthesis gas product, the process comprising feeding a gaseous mixture comprising methane, $CO_2$, and $H_2O$ to a $CO_2$-steam reforming reactor, said $CO_2$-steam reforming reactor containing a catalyst comprising at least two noble metals selected from the group consisting of Pt, Rh, Ru, Pd, Ag, Os, Ir, and Au on a solid support comprising cerium oxide in an amount of at least 80% by weight of the solid support, said catalyst comprising less than 0.05% by weight of metals other than said at least two noble metals and metals of said solid support,
wherein, in the $CO_2$-steam reforming reactor, at least about 80% of the methane is converted by reaction with $CO_2$ and $H_2O$ as oxidants.

2. The process of claim 1, wherein the at least two noble metals are Pt and Rh.

3. The process of claim 2, wherein the Pt is present in an amount from about 0.05% to about 5% by weight of the catalyst.

4. The process of claim 2, wherein the Rh is present in an amount from about 0.05% to about 5% by weight of the catalyst.

5. The process of claim 4, wherein the Rh is present in the catalyst in an amount from about 0.5% to about 2% by weight.

6. The process of claim 3, wherein the Pt is present in the catalyst in an amount from about 0.5% to about 2% by weight.

7. The process of claim 1, wherein the $H_2O$ is present in the gaseous mixture in an amount from about 15 mol-% to about 70 mol-%.

8. The process of claim 1, further comprising, prior to said feeding of the gaseous mixture comprising methane, $CO_2$, and $H_2O$ to the $CO_2$-steam reforming reactor:
combining a methane-containing feedstock and a $CO_2$-containing oxidant to obtain the gaseous mixture,
wherein the $H_2O$ in the gaseous mixture is initially present in the methane-containing feedstock and/or the $CO_2$-containing oxidant.

9. The process of claim 8, wherein the gaseous mixture further comprises at least about 100 mol-ppm of total sulfur.

10. The process of claim 8, wherein the gaseous mixture further comprises aromatic and olefinic hydrocarbons in a combined amount from about 1 mol-% to about 25 mol-%.

11. The process of claim 8, wherein the methane-containing feedstock comprises natural gas or methane from a renewable methane source.

12. The process of claim 1, further comprising, prior to said feeding of the gaseous mixture comprising methane, $CO_2$, and $H_2O$ to the $CO_2$-steam reforming reactor:
combining an $H_2O$-containing oxidant, a methane-containing feedstock, and a $CO_2$-containing oxidant to obtain the gaseous mixture.

13. The process of claim 1, wherein conditions of the $CO_2$-steam reforming reactor include a weight hourly space velocity (WHSV) from about $0.1^{-1}$ to about 2.5 hr$^{-1}$, to provide the synthesis gas product as an effluent from the CO$_2$-steam reforming reactor.

14. The process of claim 1, wherein conditions of the CO$_2$-steam reforming reactor include a temperature from about 649° C. to about 816° C.

15. The process of claim 14, wherein the conditions further include a gauge pressure from about 0 kPa to about 517 kPa.

16. The process of claim 1, wherein, in the CO$_2$-steam reforming reactor, at least about 85% of the methane is converted at a temperature of at most about 704° C.

17. The process of claim 1, wherein the synthesis gas product comprises H$_2$ in an amount representing at least about 70% of hydrogen in hydrogen-containing compounds, including the methane and the H$_2$O present in the gaseous mixture.

18. The process of claim 1, wherein the synthesis gas product has a molar H$_2$:CO ratio from about 1.5:1 to about 2.3:1.

19. The process of claim 1, wherein the gaseous mixture further comprises one or more light hydrocarbons selected from the group consisting of ethane, ethylene, propane, and propylene.

20. The process of claim 1, wherein the methane is obtained from a renewable resource.

21. The process of claim 20, wherein the renewable resource is biomass.

22. A process for producing a synthesis gas product, the process comprising feeding a gaseous mixture comprising methane, CO$_2$, and H$_2$O to a CO$_2$-steam reforming reactor, said CO$_2$-steam reforming reactor containing a catalyst comprising from about 0.3 wt-% to about 3 wt-% Pt and from about 0.3 wt-% to about 3 wt-% Rh on a solid support comprising cerium oxide in an amount of at least 80% by weight of the solid support, wherein reforming conditions of the CO$_2$-steam reforming reactor include a weight hourly space velocity (WHSV) from about $0.1^{-1}$ to about $4.0^{-1}$ and a gauge pressure from about 0 kPa to about 517 kPa, and wherein the catalyst is sufficiently active to achieve, in the CO$_2$-steam reforming reactor, a conversion of the methane of at least 95% by reaction with CO$_2$ and H$_2$O as oxidants at a temperature of 760° C.

23. A process for producing a synthesis gas product, the process comprising feeding a gaseous mixture comprising methane, CO$_2$, and H$_2$O to a CO$_2$-steam reforming reactor, said CO$_2$-steam reforming reactor containing a catalyst comprising at least one noble metal on a solid support comprising cerium oxide in an amount of at least 80% by weight of the solid support, wherein, in the CO$_2$-steam reforming reactor, at least about 80% of the methane is converted by reaction with CO$_2$ and H$_2$O as oxidants, and wherein the gaseous mixture has a sulfur level from about 10 mol-ppm to about 1 mol-%, the process further comprising adjusting a temperature of the CO$_2$-steam reforming reactor based on a determination of said sulfur level.

24. The process of claim 23, wherein the sulfur level is from about 100 mol-ppm to about 1000 mol-ppm.

25. The process of claim 24, wherein the sulfur level is from about 500 mol-ppm to about 1000 mol-ppm.

* * * * *